United States Patent [19]

Kumar et al.

[11] Patent Number: 5,676,256

[45] Date of Patent: *Oct. 14, 1997

[54] SCRAP SORTING SYSTEM

[75] Inventors: Pradeep Kumar, Ann Arbor; Richard B. Wolanski; Mark S. Wolanski, both of Dexter, all of Mich.

[73] Assignee: Huron Valley Steel Corporation, Belleville, Mich.

[*] Notice: The term of this patent shall not extend beyond the expiration date of Pat. No. 5,520,290.

[21] Appl. No.: 736,275

[22] Filed: Oct. 24, 1996

Related U.S. Application Data

[60] Continuation of Ser. No. 472,182, Jun. 7, 1995, abandoned, which is a division of Ser. No. 176,018, Dec. 30, 1993, Pat. No. 5,520,290.

[51] Int. Cl.[6] ................................................. B07C 5/342
[52] U.S. Cl. ................... 209/580; 209/587; 209/938; 209/939; 250/223 R; 198/349.1
[58] Field of Search ................................... 209/576, 577, 209/580, 581, 582, 587, 639, 644, 938, 939; 250/205, 225, 223 R; 198/349.1

[56] References Cited

U.S. PATENT DOCUMENTS

| | | | |
|---|---|---|---|
| 2,717,086 | 9/1955 | Bush | 198/349.1 |
| 3,928,183 | 12/1975 | Asfour | 209/639 X |
| 3,977,526 | 8/1976 | Gordon et al. | 209/639 X |
| 4,466,544 | 8/1984 | Satake et al. | 209/580 |
| 4,493,420 | 1/1985 | Dennis | 209/587 |
| 4,504,888 | 3/1985 | Rosenthal | 362/18 |
| 4,513,868 | 4/1985 | Culling et al. | 209/581 |
| 4,687,107 | 8/1987 | Brown et al. | 209/587 X |
| 4,693,378 | 9/1987 | Azegami et al. | 209/939 X |
| 4,699,273 | 10/1987 | Suggi-Liverani et al. | 209/580 |
| 4,745,272 | 5/1988 | Andreatti, Jr. | 250/223 R X |
| 4,799,596 | 1/1989 | Mallant | 209/580 |
| 4,848,590 | 7/1989 | Kelly | 209/639 X |
| 5,021,645 | 6/1991 | Satula et al. | 250/223 R |
| 5,042,947 | 8/1991 | Potzschke et al. | 209/579 X |
| 5,060,871 | 10/1991 | Brassinga et al. | 209/212 X |
| 5,085,325 | 2/1992 | Jones et al. | 209/580 |
| 5,090,576 | 2/1992 | Menten | 209/587 |
| 5,101,101 | 3/1992 | Sawamura | 250/223 R |
| 5,305,894 | 4/1994 | McGarvey | 209/580 |
| 5,520,290 | 5/1996 | Kumar et al. | 209/587 X |

FOREIGN PATENT DOCUMENTS

| | | | |
|---|---|---|---|
| 9303863 | 3/1993 | WIPO | 209/639 |

Primary Examiner—William E. Terrell
Assistant Examiner—Tuan Nguyen
Attorney, Agent, or Firm—Brooks & Kushman P.C.

[57] ABSTRACT

A scrap particle sorting system and attendant sorting process employs a conveyor for conveying the randomly shaped particles in a random orientation, a position sensor for determining the advancement of the scrap particles in the direction of conveyance by determining the position of the conveyor belt, an image detector for periodically recording the image of a predefined viewing area through which the scrap particles are conveyed, and an image processor for periodic acquisition and processing of the images. The image processor includes logic for defining each image of the viewing area into a matrix of cells, and for each acquired image, analyzing the digital data corresponding to the image to determine for each cell in the matrix whether the pixels in that cell satisfy a predetermined criteria, and establishing a discriminator signal for each cell in the matrix as a function of that analysis. The system employs an image detector controller for receiving a signal from the conveyor position sensor and sending an activation signal to the image processor at timed intervals to acquire sequential image frames which include each of the scrap particles as they are conveyed past the viewing area, and a separator controller for receiving the discriminator signals from the image processor and for sending a control signal to selectively activate the appropriate portion of the separator to eject desired from undesired particles.

16 Claims, 9 Drawing Sheets

5,676,256

SCRAP SORTING SYSTEM

This is a continuation of application Ser. No. 08/472,182 filed on Jun. 7, 1995, now abandoned, which is a divisional of application Ser. No. 08/176,018, filed on Dec. 30, 1993, now U.S. Pat. No. 5,520,290.

TECHNICAL FIELD

The present invention relates to a system for sorting scrap particles based upon their color.

BACKGROUND ART

It is well known to sort pieces of scrap metal according to metal type by melting the commingled scrap until the type of metal with the relatively lower melting temperature melts, thus separating it from the remaining commingled metal scraps. Considerable energy, however, is required to heat the scrap particles. Moreover, recovery is reduced because some of the particles become coated with other melted metals during the process.

It is also known to utilize image processing systems to sort articles by size, shape, and/or color. However, existing image processing sorting systems require that the articles to be sorted are conveyed in a specific orientation through the system and/or consist of a uniform size and shape. Existing systems typically "scan" the image to identify objects matching certain pre-defined shapes. This method of processing the image is often time-consuming. Moreover, the speed of processing is dependent upon the complexity of shape, as well as the number of objects in the image. This approach is particularly problematic when attempting to sort scrap particles which are unpredictably irregular in size and shape.

Another limitation to existing image processing sorting systems is the difficulty in maintaining consistent, even illumination of the viewing area through which the particles are conveyed.

Another drawback of existing image processing sorting systems is the difficulty in maintaining a uniform contrasting background to the particles.

Another drawback of the existing image processing sorting systems is that the efficiency of the system is affected by variations in the conveyor speed due to, for example, mechanical problems such as slippage.

DISCLOSURE OF INVENTION

One object of the present invention is to provide a system for sorting scrap particles as they are transported on a conveyor which is not dependent upon the positioning of the particles on the conveyor.

Another object of the present invention is to provide a system for sorting scrap particles having widely ranging random shapes.

Another object of the present invention is to provide a system for sorting scrap particles having a wide range of reflectivity.

Another object of the present invention is to provide an image processing scrap particle sorting system wherein the speed and efficiency of operation of the system is not affected by the number of scrap particles being sorted.

Another object of the present invention is to provide a system for sorting scrap particles wherein the sorting accuracy of the system is not affected by variations in conveyor speed due to a mechanical problem, such as slippage.

Another object of the present invention is to provide an image processing scrap particle sorting system wherein the surface upon which the particles are conveyed has a uniform background.

In carrying out the above and other objects, the scrap particle sorting system of the present invention includes a conveyor for conveying the randomly shaped scrap particles in a random orientation, a conveyor position sensor for determining the linear advancement of the scrap particles in the direction of the conveyance, an image detector for electronically recording the image of a predefined viewing area through which the scrap particles are conveyed by the conveyor, and an image processor for periodic acquisition and processing of the images. The image processor includes logic for dividing each image of the viewing area into a matrix of cells. For each acquired image, the image processor analyzes the digital data corresponding to the image to determine for each cell in the matrix whether the pixels in that cell satisfy a predetermined criteria, and establishes a discriminator signal for each cell in the matrix as a function of that analysis. The system includes an image detector controller for receiving a signal from the conveyor position sensor and for sending an activation signal to the image processor at timed intervals to cause the image processor to acquire sequential image frames which include each of the scrap particles as they are conveyed past the viewing area, and a separator controller for receiving the discriminator signals from the image processor and for sending a control signal to selectively activate the appropriate portion of the separator to eject desired from undesired particles as they are dispatched from the conveyor.

The system may also include a wetting device mounted upstream from the image detector for wetting the surface of the conveyor, thereby creating a more uniform background for the acquired images.

The system may also include a plurality of conveyor sections located along the length of the conveyor upstream from the image detector, wherein each of the sections convey the particles at progressively increasing speeds, thereby progressively separating the scrap particles from each other in the direction of conveyance to provide for a more efficient processing of the acquired images.

In one embodiment, the image detector comprises an RGB color, broadcast quality CCD camera. A lighting shroud, which is illuminated by a plurality of fluorescent lights with diffuser panels interposed between the lights and the viewing area, provides constant, controlled illumination of the viewing area on the conveyor.

The image processor may perform various analyses on each of the digital pixel values recorded for an image. However, in one embodiment of the present invention, the system analyzes the digital values for each pixel to determine whether a predefined color criteria is met, then analyzes the results for the pixels in each cell of the matrix and, based upon a predetermined selection criteria, establishes a discriminator signal corresponding to each cell for output to the separator controller. Again, various criteria can be utilized for determining the value of the discriminator signal, including frequency, location, and density of the identified pixels. In one embodiment, the discriminator signal is merely a function of the number of pixels in that cell which satisfy the color criteria.

The image processing function, the image detector, conveyor position sensor, and separator control functions, as well as other control functions utilized by the system, may be performed by one or more hardware control means as desired. In one embodiment, the image processor is built around an intel 80486 based CPU suitably enhanced by plug-in cards to perform image acquisition and processing, as well as data transmission functions. The image detector control and separator control functions are embodied in a suitably programmed programmable logic controller (PLC).

A uniformly contrasting background may be achieved by employing a uniform color conveyor belt with a wetting device mounted over the conveyor belt upstream of the viewing area for spraying a liquid, such as water, on the moving conveyor belt. The wet surface of the conveyor belt is thereby darkened and more uniform in color than the dry belt, which often becomes faded and discolored as a result of the dust and debris left by the scrap particles conveyed thereon.

The separator may comprise a plurality of spaced apart air nozzles which are selectively activated in a timed fashion to direct a jet of air onto selected scrap particles, thereby altering their trajectory as they are discharged from the conveyor belt so that the particles are selectively directed into separate bins.

The system of the present invention thus provides an image processing system which effectively sorts randomly shaped and randomly located scrap particles as they are conveyed on a high speed conveyor. Because the image processor analyzes the images by cell, rather than attempting to locate and examine articles of a specified size or shape, processing time is greatly reduced and, therefore, conveyor speed and sorting rate greatly increased. Also, since the processor does not attempt to discriminate the individual particles, processing is not affected by the number of particles conveyed.

These and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
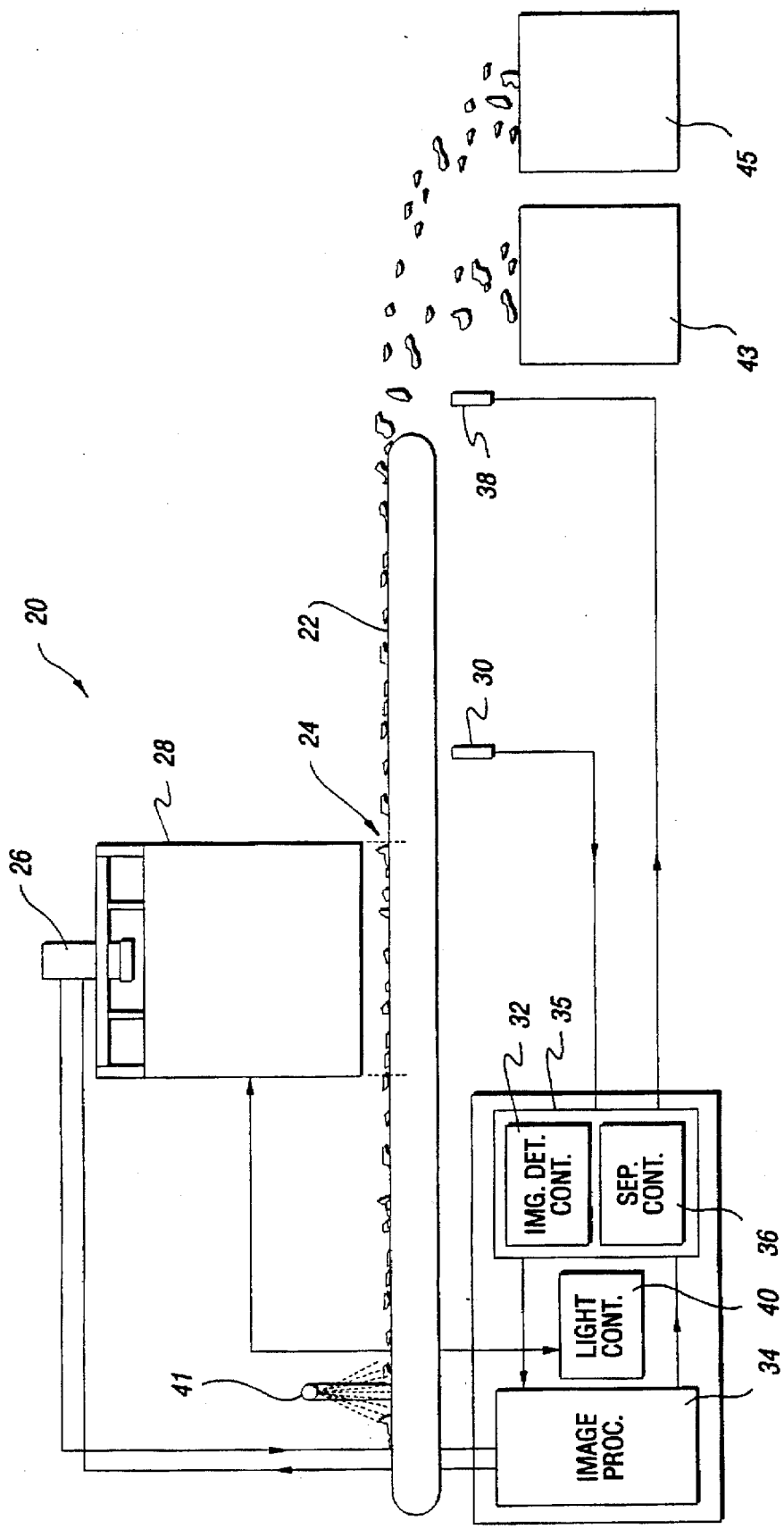
FIG. 1 is a diagrammatic view of the sorting system of the present invention.

Referring now to FIG. 1, the scrap particle sorting system of the present invention, generally designated as 20, includes a conveyor 22 which conveys the randomly shaped scrap particles in a random orientation through the viewing area 24 at which a series of images are detected by the image detector 26. The viewing area 24 is illuminated in a uniform, controlled fashion by a lighting shroud 28. A position sensor 30 determines the linear advancement of the conveyor 22, and thus the advancement of the scrap particles thereon, and transmits signals indicating this advancement to the image detector controller 32. When the conveyor has advanced a distance equal to the length of the viewing area, the image detector controller emits a control signal to the image processor 34 to acquire an image of the viewing area.

After each image is acquired, the image processor 34 analyzes the data to determine, for each cell in the predefined imaginary matrix superimposed on the viewing area, whether the pixels in that cell satisfy a predetermined criteria. The image processor 34 then establishes a discriminator signal corresponding to each cell of the imaginary matrix. These discriminator signals are then communicated to a separator controller 36, which in a timed fashion transmits the control signals to the separator 38 based upon the values of the discriminator signals to activate selective portions of the separator in a controlled fashion to eject desired from undesired particles as they are dispatched from the conveyor 22. For example, the system may sort copper or brass particles from zinc particles by selectively directing the copper and brass particles into a downstream bin 45, while the zinc particles are discharged into bin 43 nearer the end of the conveyor 22.

The lighting shroud 28 is operatively connected to a lighting control 40, which provides uniform illumination of the viewing area 24.

The system 20 may include a wetting device 41 which extends across the width of the conveyor 22 upstream from the viewing area 24, to provide a constant spray of liquid onto the surface of the conveyor 22 to create a darkened, more uniform conveyor surface as the background.

Figure 2:
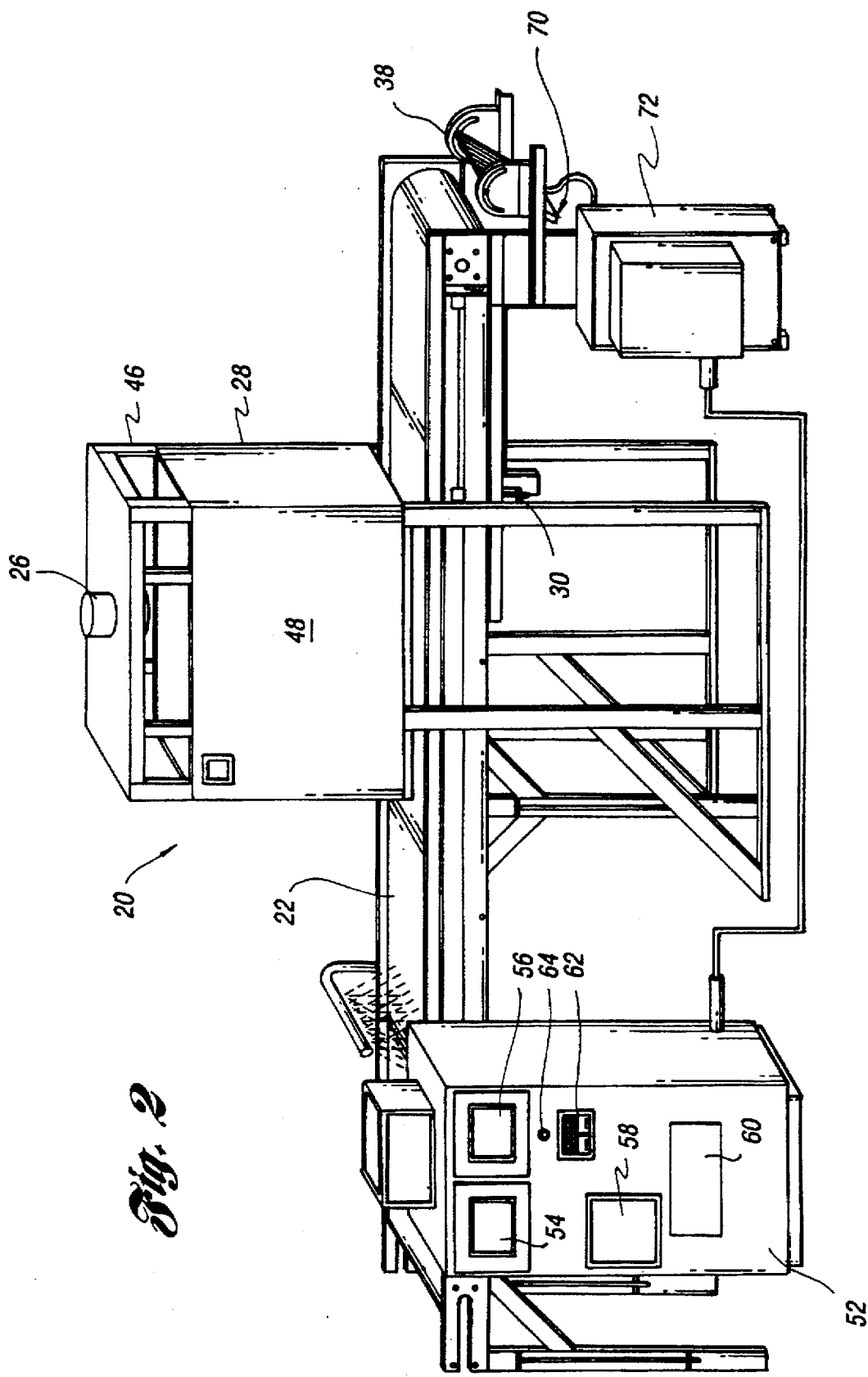
FIG. 2 is a perspective view illustrating one embodiment of the sorting system of the present invention.
Figure 3:
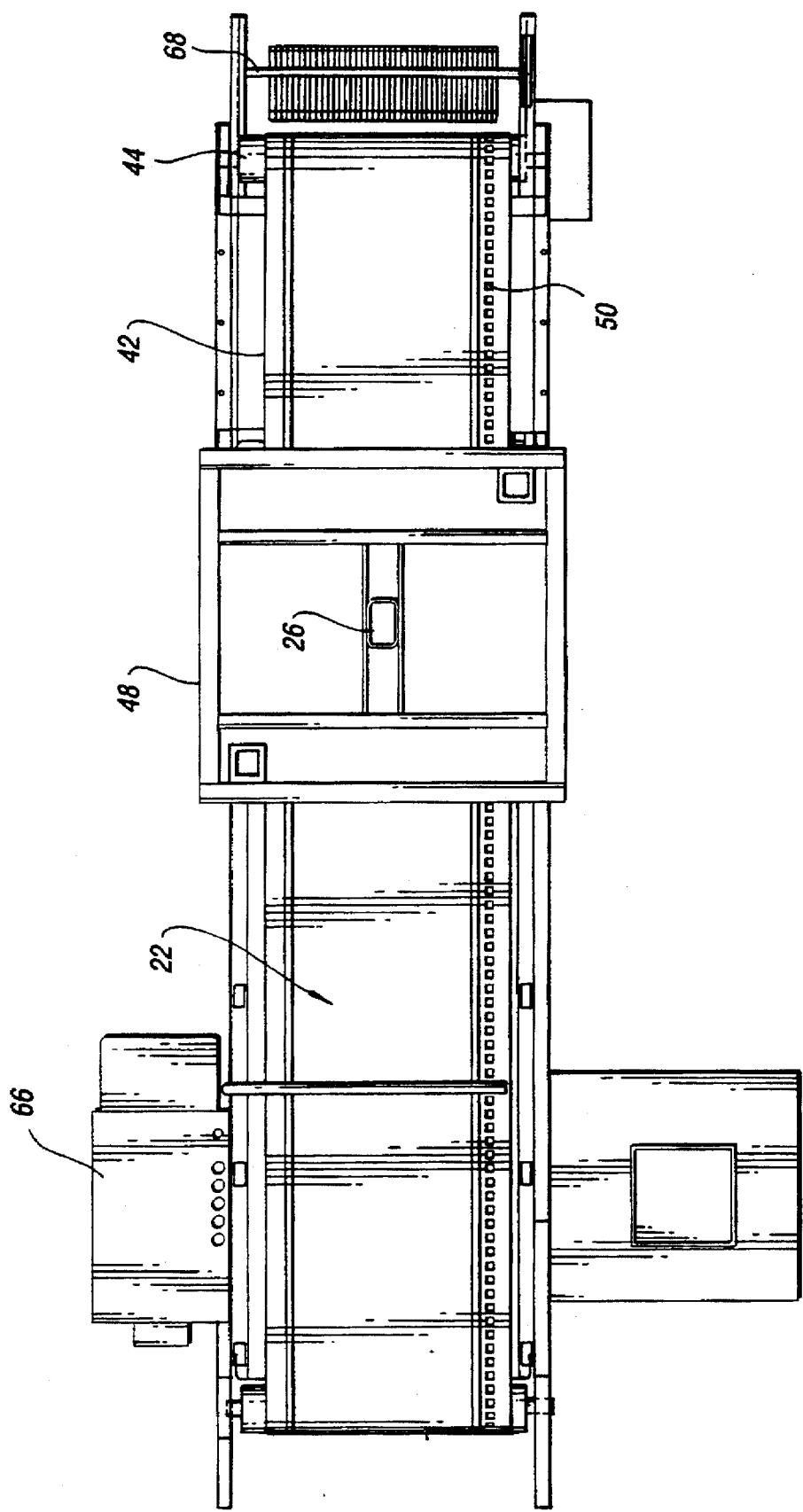
FIG. 3 is a top view of the sorting system shown in FIG. 1.

Referring to FIGS. 2 and 3 which illustrate one embodiment of the system of the present invention 20, the conveyor 22 comprises an endless belt 42 driven by a conventional motorized head pulley 44. The image detector 26 employs a three chip, RGB color CCD camera such as model XC-007, available from Sony Corporation. The camera is mounted within the lighting shroud 28 which comprises a generally rectangular frame 46 covered on four sides by opaque panels 48.

The position sensor 30 comprises a commercially available timing eye comprising, for example, LED part number 42SRU 6202, reflector number 92-47 and mounting plate number 60-2008, all available from Allen-Bradley Corporation. The LED and reflector are mounted so that the beam is alternately transmitted through and interrupted by the rectangular openings 50 which are equal in length to the opaque belt spaced therebetween. In one embodiment, the openings are one inch in length with one inch separation between them. The components of the position sensor 30 transmit a high signal to the image detector and separator controllers at the leading edge of each opening 50, and a low signal to each of the image detector and separator controllers at the trailing edge of each opening. The image detector controller can maintain a count of the signals received from the position sensor 30 and determine whether the accumulated count equals the preset value corresponding to the length of the viewing area. Thus, for example, in the embodiment where the openings are 1 inch in length with 1 inch separation between them, when the accumulated count equals 36 (or 18 high signals), the image detector controller 32 transmits a signal to the image processor to acquire another image, then clears the accumulated count to renew tracking the movement of the conveyor belt. The separator controller 36 can similarly maintain a count of the signals transmitted by the position sensor 30 to determine whether this accumulated count equals a preset value corresponding to the length of one row of cells in the imaginary matrix. Again, each time the accumulated count reaches the preset value, the separator controller 36 can transmit the appropriate activation signals to selectively activate the appropriate air blast nozzles to separate selected scrap particles located on the conveyor in positions corresponding to the cells in the next row of the matrix which have reached the discharge end of the belt. It will thus be appreciated that the image detector 26 and separator 38 can each be synchronized with the conveyed scrap particles independently of any variations in belt speed.

The image processor is built around a conventional Intel 80486 based personal computer. Image acquisition and storage capability may be provided using plug-in boards such as Image-CLD and Image-1280, respectively, from Matrox Electronic Systems, Ltd. Computationally intensive image processing functions may be performed on an additional plug-in board of the type image-RTP, also available from Matrox Electronic Systems, Ltd. Data consisting of on/off states of air valves could be transmitted to the separator controller using high speed serial data transmission interface boards such as 1784-KT, available from Allen-Bradley Corporation. The 80486 based PC forms the integrating platform around which these various plug-in boards may be configured, programmed, and controlled.

The computer station 52 may include several conventional CRT screens 54-58. Screen 54 displays the processed image for a selected image, screen 56 displays the unprocessed image detected by the camera, and screen 58 is the operator interface screen for the image processing computer. Access to conventional input means, such as a keyboard, is provided at 60. A push-button module 62 may also be utilized to provide the operator with often-used system control keys, and a stop button 64 is preferably located on the front panel of the computer station 52 to provide for quick deactivation of the system when desired.

In the embodiment shown in FIGS. 2 and 3, the computer station 52 also includes the image detector control 32 and separator control 36, in the form of a suitably programmed PLC (shown in outline as 35 in FIG. 1). PLC Model No. 5/20, available from the Allen-Bradley Corporation, may be programmed to perform the two timing control functions associated, respectively, with activating the image detector and activating the separator.

In the embodiment illustrated in FIG. 3, the lighting control 40 is housed within control box 66. In this embodiment, the control comprises one or more light controllers associated with the fluorescent bulbs in the lighting shroud 28. Coupled to each light controller is a photoelectric eye which is mounted within the lighting shroud (shown as 80 in FIG. 4) which senses the illumination level within the shroud, and sends a signal to the light controllers in the light control box 66. The controllers then automatically adjust the level of illumination of the bulbs to maintain the illumination within the shroud at a predetermined level. Light controller Model No. FX1096, available from Mercron, Inc., in Texas, may be suitably configured to perform the function of the lighting control 40.

The separator 38 comprises a plurality of air blast nozzles 70 disposed in ejector plate 68 across the width of the conveyor. The nozzles (shown in greater detail in FIGS. 5 and 6) are connected to corresponding electrically actuated air valve assemblies in assembly box 72. The air valve assembly comprises solenoid valves, Model No. N-721, available from the Honeywell Corporation. The separator control function in the PLC 35 is programmed to transmit activation signals to selectively activate the appropriate valve assemblies at the appropriate time (as described in further detail hereinafter) to emit a blast of air from selected nozzles 70 at the ejector plate 68, thereby directing selected scrap particles away from the particle bin nearest the discharge end of the belt into another particle bin further downstream of the discharge end of the belt.

Figure 4:
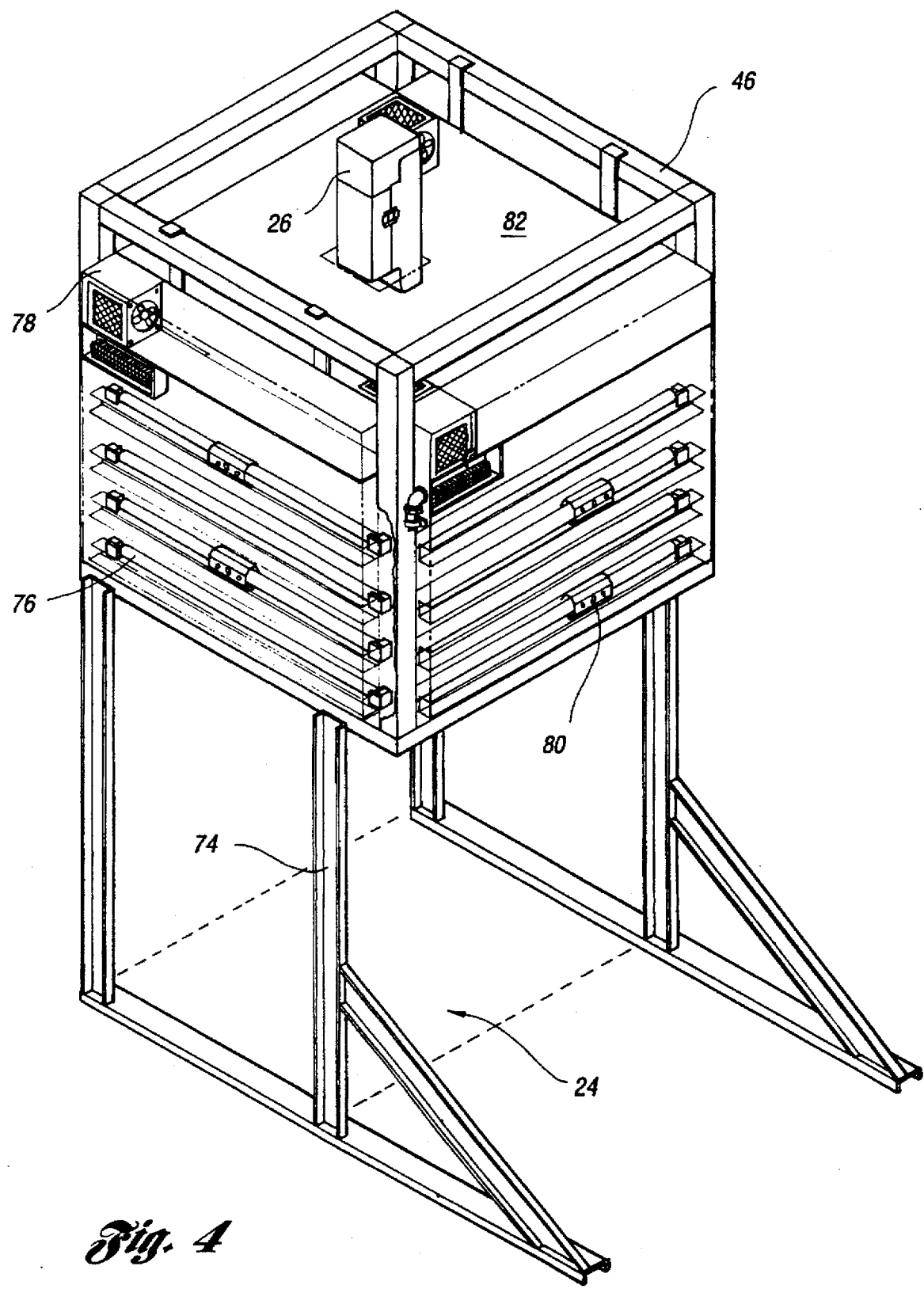
FIG. 4 is a partial cut-away view of the image detector and lighting shroud utilized in the embodiment of FIG. 2.

Referring to FIG. 4, the lighting shroud and camera assembly of the embodiment of the system 20 shown in FIGS. 2 and 3 includes a generally rectangular frame 46 and frame mounts 74 fabricated from suitable structural material, such as aluminum or sheet metal. In one embodiment, four General Electric No. F48T12/CWX/HO fluorescent lamps 76 are mounted in each of the side walls defined by the frame 46. One or more fans, such as Conair Model No. MU20A1 with suitable filters, are mounted within the shroud to remove the heat, dust and debris from the viewing area. A series of photoelectric eyes 80 are mounted in the side light panels, and are operably connected to the light controllers to provide a constant feedback signal indicating the level of illumination within the shroud.

The outside of the side walls of the frame 46 are covered with opaque panels (not shown) which may be fabricated from sheet metal or other suitable material. The inside of the side walls are covered with light diffuser material to provide for diffuse, even lighting of the viewing area 24. In the illustrated embodiment, the diffuser panels comprise ¼"×4'× 6" white acrylic sheets. The CCD color camera is utilized as the image detector 26, and is mounted atop the lighting shroud so that the lens of the camera projects into the illuminated area within the shroud through an opaque top panel 82.

Figure 5:
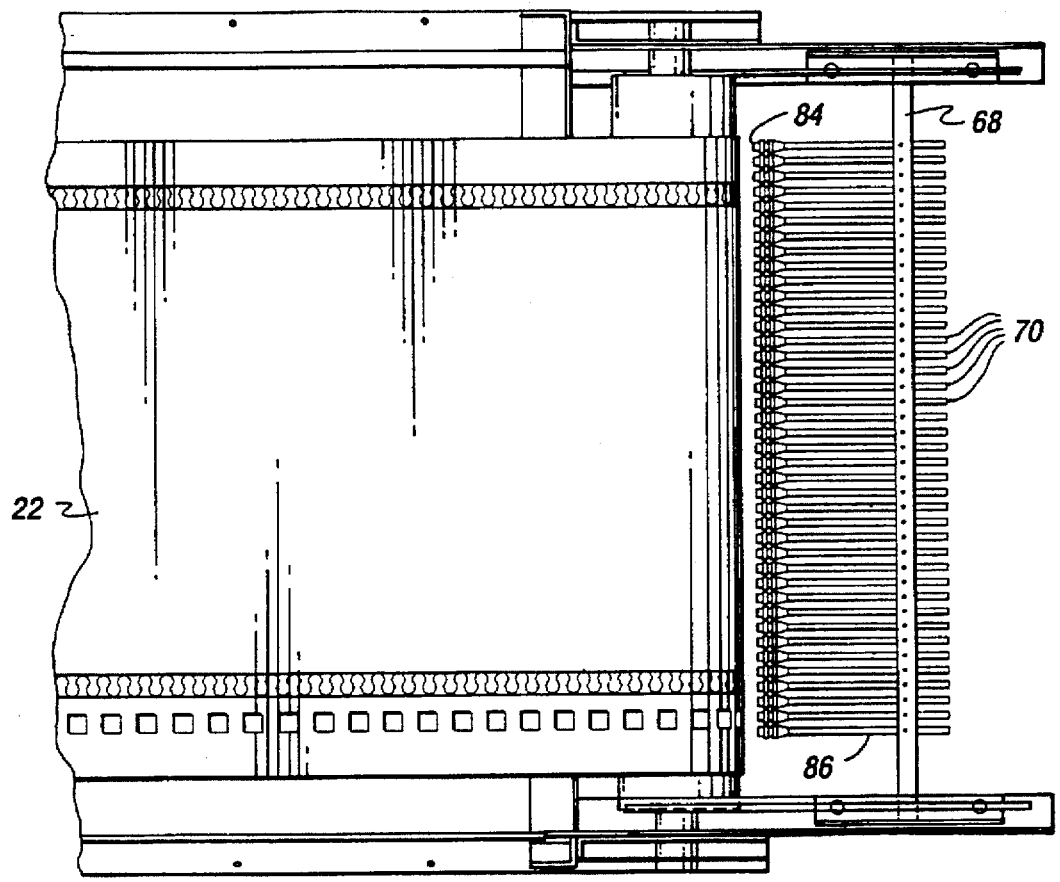
FIG. 5 is a partial front view of the separator utilized in the embodiment of FIG. 2.
Figure 6:
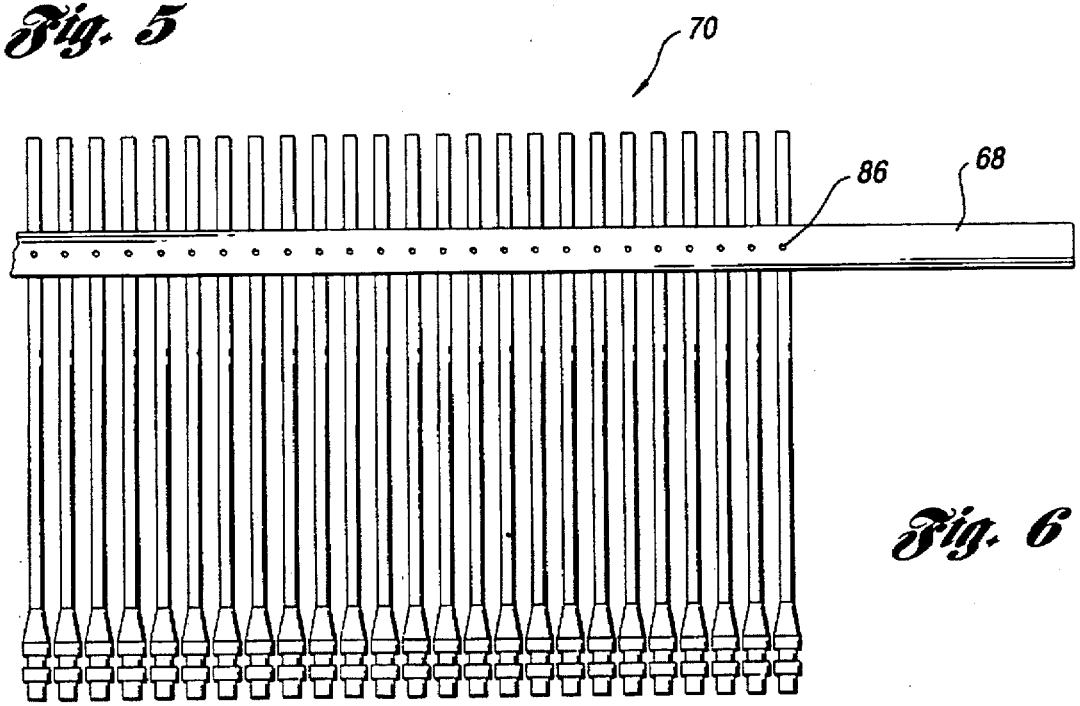
FIG. 6 is the top view of the separator utilized in the embodiment of FIG. 2.

Referring now to FIGS. 5 and 6, the separator 38 employs a plurality of air blast nozzles 70 mounted across the width of the discharge end of the conveyor 22. The discharge end of the air blast nozzles are connected to an ejector plate 68 through spaced apart holes and are secured in place by set screws 86. In one embodiment, the holes are spaced one-half inch apart across the width of the conveyor 22. Thus, for example, where the imaginary cell dimension is ½ inch (in the direction perpendicular to the direction of travel of the conveyor) by 1 inch (in the direction of travel of the conveyor), the holes on the ejector plate 68 may be positioned so that a blast nozzle mounted therethrough is at the center of where each cell would be if one row of cells from the imaginary matrix were superimposed over the ejector plate 68. It is desirable to have correspondence of one or more nozzles 70 with each cell across the width of the imaginary matrix so that the separator control 36 can selectively signal the corresponding air nozzles for a particular cell, as required for each row in the matrix for each image, to selectively eject the scrap particle located at that cell position which has been determined as qualifying for separation from the others.

Figure 7:
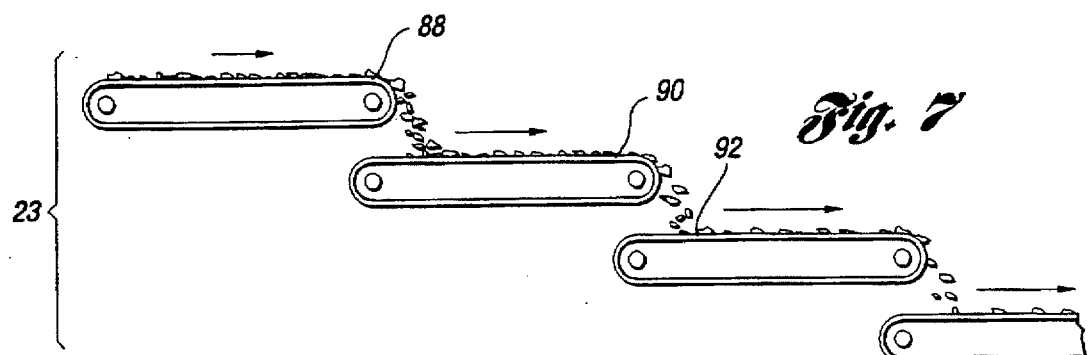
FIG. 7 is a diagrammatic view of a particle distributor which may be utilized by the present invention.

Referring to FIG. 7, the system 20 of the present invention may include an article spacer 23 located upstream from the conveyor 22 for modifying the extent of separation of the scrap particles prior to depositing them on the conveyor 22. The article spacer 23 may include a series of endless belt conveyors 88, 90, 92, with each of the conveyors set to travel at progressively increasing speeds (to increase the relative separation of the particles in the direction of conveyance), or progressively decreasing speeds (to decrease the relative separation between the scrap particles in the direction of conveyance). It will be appreciated that by utilizing these stepped conveyors, the desired spacing can be obtained to ensure that the scrap particles are separated by a distance generally greater than the dimension of the matrix cells in the direction of conveyance, thereby minimizing the chance that more than one scrap particle is in any one cell. Of course, while three endless belt conveyors 88, 90, 92 are shown in addition to the system's main belt conveyor 42, any number of separate conveyors may be utilized at various speed differences depending upon the desired degree of separation of the scrap particles.

CAMERA AND SEPARATOR CONTROL FUNCTIONS

Figure 8:
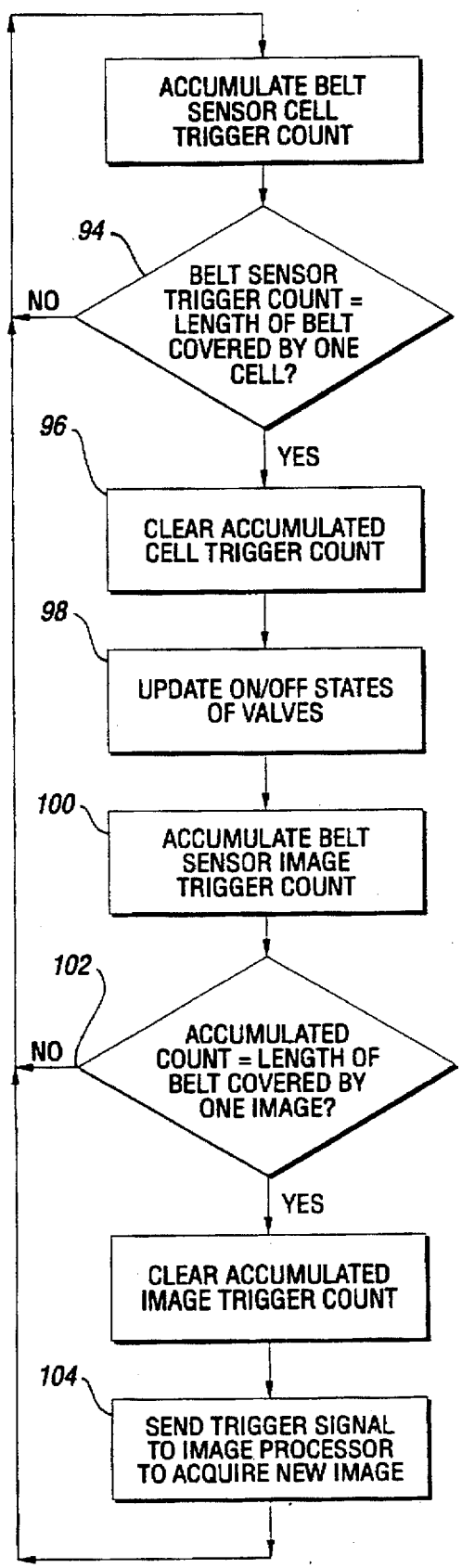
FIG. 8 is a flowchart of the image detector and separator control functions.

FIG. 8 illustrates the general flowchart for the camera and separator control functions. In one embodiment, these control functions are both performed by a single suitably programmed PLC which obtains belt position information from the position sensor 30. The belt sensor 30 sends the PLC a trigger signal each time it senses the leading or trailing edge of an opening 50 on the conveyor belt 42. The PLC periodically checks, at 94, to determine whether the accumulated belt sensor cell trigger count is equal to a number corresponding to a length of the conveyor belt equal to the dimension of one cell. If not, the system exits the sub-routine. If so, the system clears the accumulated cell trigger count, at 96, and transmits a discriminator signal for the next row of cells in the separator control's memory queue to the blast air valves. It should be noted that, though (as will be described in further detail hereinafter) the image processor sends the separator memory of the PLC a data block of binary discriminator signals corresponding to an entire image matrix of m×n cells, the separator control logic, at 98, transmits a single row of 1×n discriminator signals to the air valves in a timed fashion suitable to activate the selected air valves. This data transmission is effected when the portion of the belt (and scrap particles thereon) corresponding to that particular row of cells has reached the discharge end of the conveyor 22. It will be appreciated by the previous description that, thereafter, the valve activation signals are transmitted by the separator controller in a row by row manner on the basis of the signals received by the belt position sensor 30.

The separator control then indexes the accumulated belt sensor image trigger count, at 100, and checks to determine whether the accumulated belt sensor image trigger count is equal to the number corresponding to the length of belt covered by one image. If the belt has not yet traveled a distance equal to the length of one image, the system exits the sub-routine at 102. If the count indicates that the belt has traveled the length of one image, the system clears the accumulated image trigger count and sends a trigger signal to the image processor, at 104, to acquire another image.

Thus, it will be appreciated that the constant monitoring of the conveyor belt movement by the PLC allows for timed dispatch of the appropriate control signals to both the separator 38 and the image processor 34.

Figure 9:
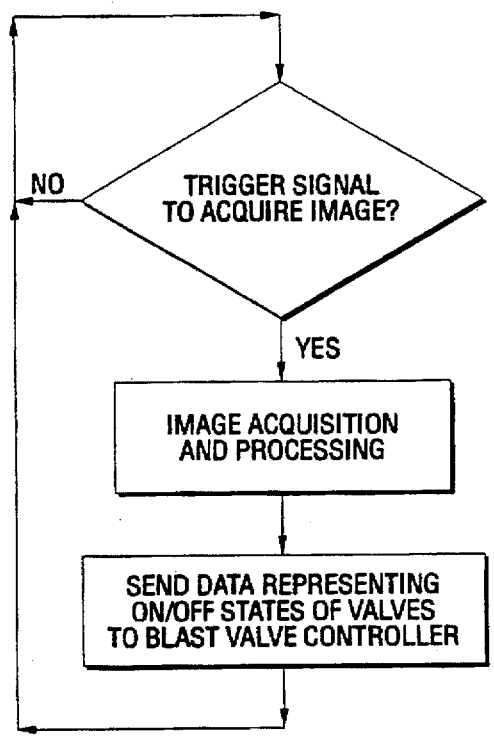
FIG. 9 is a flowchart generally illustrating the image processing and resultant data transmission conducted by the image processor.

Referring now to FIG. 9, each time an image trigger signal is received by the image processor, an image is acquired and processed as further described hereinafter. As a result of the processing, the image processor generates a block of on/off discriminator signals corresponding to each of the cells of the matrix superimposed on the image by the processor. This block of data is sent as a serial stream of size equal to one bit per cell for an entire matrix of cells covering one image. The data is transmitted to the separator control in the PLC, where it is queued in memory. These blocks of binary discriminator signal data are transmitted from the image processor asynchronously from the subsequent row by row transmission of the signals by the separator controller 36 to the separator 30. It will be appreciated that this asynchronous transmission of data makes the image processor available for acquisition and processing of an adjoining section of the belt prior to when the segment that has already been processed reaches the discharge end of the conveyor 22. In addition, the finite time interval required for the receipt of the data does not influence the processing time of the PLC since it can receive data and over-write memory simultaneously while the separator control program is running. The DH+ (Data Highway Plus) data transmission scheme utilized by Allen-Bradley PLC's is used by one of the embodiments of the invention to achieve the above-described asynchronous data transmission.

IMAGE DETECTION

Figure 11:
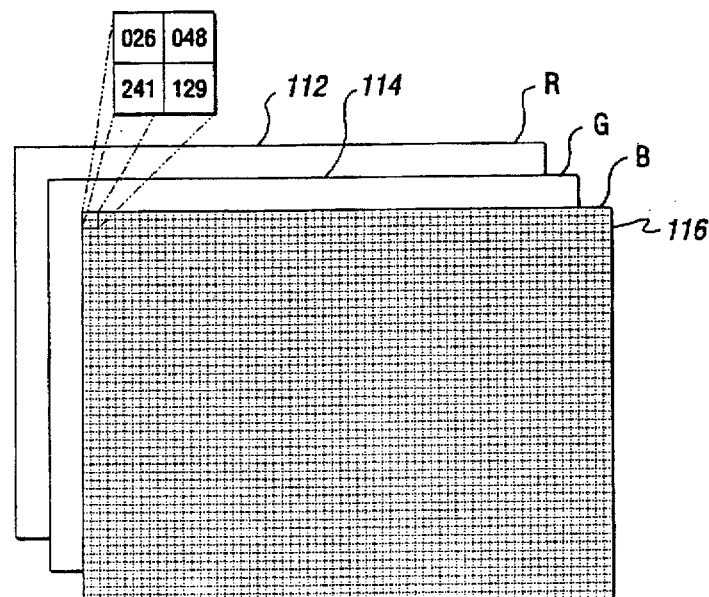
FIG. 11 is a diagram illustrating the individual pixels in the image viewing area.
Figure 10:
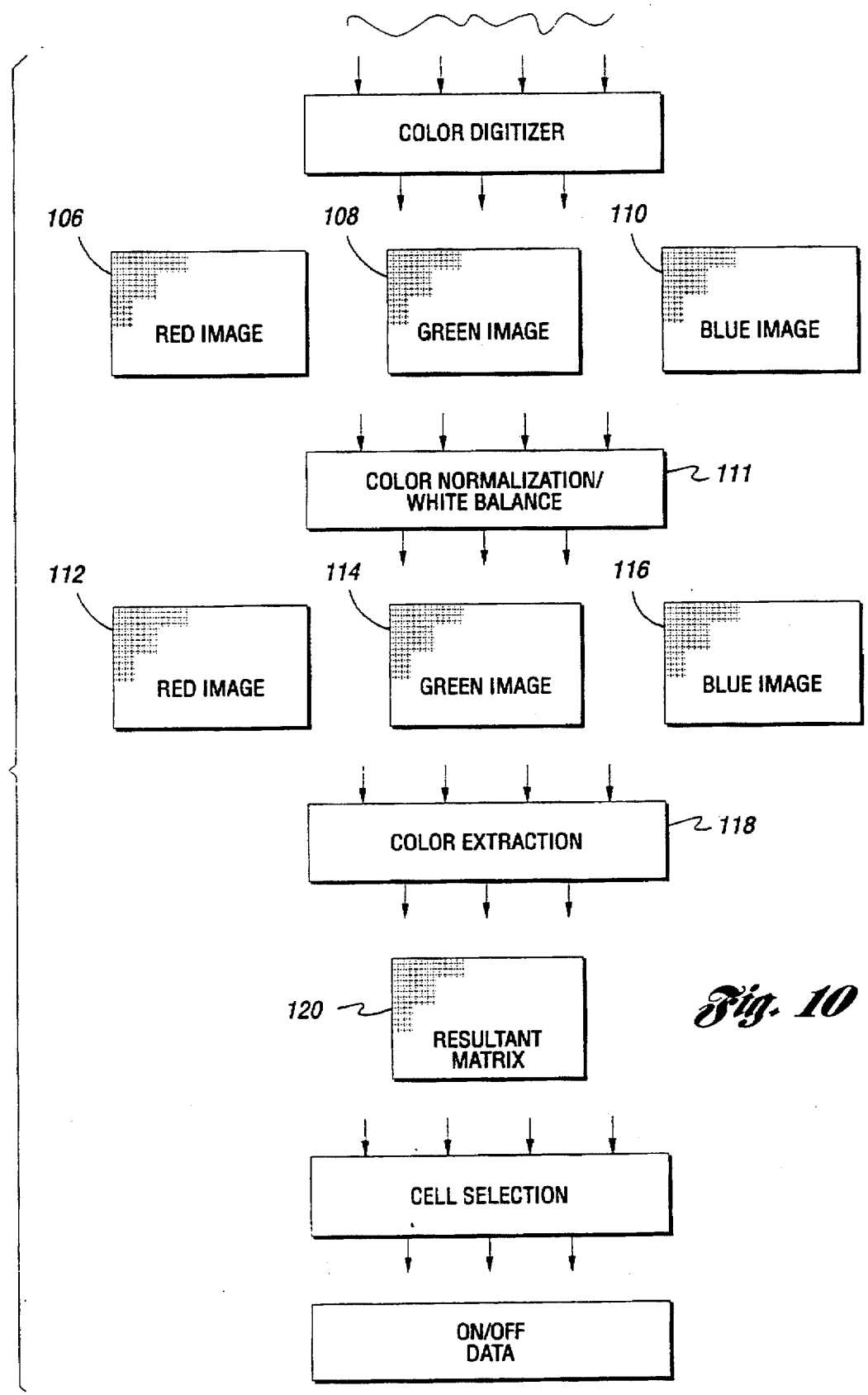
FIG. 10 is a diagram illustrating the image acquisition and processing operations of the system.

Referring to FIGS. 10 and 11, each time a new image is to be acquired, the image processor digitizes a series of analog signals transmitted by the RGB camera and corresponding to each of the red, green and blue segments of the color image of the viewing area. These signals are converted by the image processor to three arrays 106, 108 and 110 (one for red, one for green and one for blue) of approximately 480×640 digital pixel values (from 0 to 255) for each of the red, green and blue images. The 480×640 pixel arrays are the digital representations of the red, green and blue portions of the color image of the approximately 36 inch by 27 inch viewing area 24. The system then normalizes each of the red, green and blue image arrays 106, 108 and 110 to correct the spectral imbalances in the light sources. In one embodiment, this normalization is performed by modifying each of the pixel values in the red image array 106 by a normalizing value contained in a red image normalizing look-up table. The green image array 108 and blue image array 110 are likewise each normalized using green and blue image normalizing look-up tables respectively. The values in each of the red, green and blue image normalization look-up tables may be obtained through a calibration operation in which the operator views a neutral color background and digital values corresponding to the intensities of each of the red, green and blue domains are quantified, each, respectively, in the red, green and blue normalization look-up tables. After such calibration, the digital information acquired for the red, green and blue portions of each image may then be normalized prior to processing. One or more of these red, green and blue digital image arrays 112, 114 and 116 is then processed as described below for each acquired image to yield the selection information required to determine which of the scrap particles, if any, are to be separated from the others.

In operation, the analog image signals generated by the CCD camera are digitized by the image processor (as described above) whenever the position sensor has determined that the conveyor belt has travelled the length of the viewing area. Where the scrap particles are pieces of brass, copper and zinc metal, the conveyor is driven at speeds of up to 400 feet/minute, resulting in the acquisition of digital data corresponding to 2–3 images every second. In the interim period between images, the image processor 34 processes the above-described digital information as described below, and generates a series of discriminator signals which are transmitted to the separator controller 36. The separator controller 36 then selectively activates the air valves as a function of the discriminator signals to provide an ejecting force at the discharge end of the conveyor to eject the particles located in the selected cells of the imaginary matrix.

IMAGE PROCESSING

Figure 12:
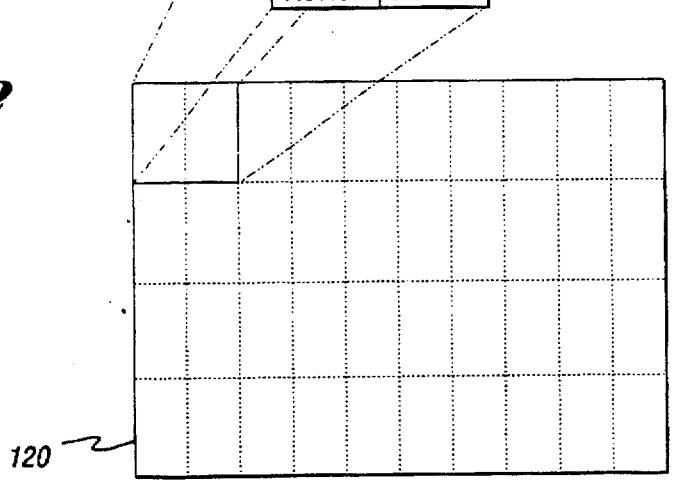
FIG. 12 is a diagram illustrating the cells in the viewing area.

Referring to FIGS. 10 and 12, the image processor 34 of the present invention analyze the arrays of digital information, to develop another array 120 of discriminator signals indicating, for each pixel in each cell, whether that pixel satisfies a preselected criteria. In one embodiment of the system utilized to separate brass and copper scrap from zinc scrap, the image processor examines the pixels to determine which of the pixels of the image is "red" enough to indicate the presence of copper or brass at that pixel location. In one particular embodiment, the system subtracts the blue value from the red value for each of the corresponding pixels in the blue array 116 and red array 112, respectively, to determine whether the difference in those values is greater than a selected threshold, preferably 25. If the difference is greater than 25, indicating reflection of a significant amount of the red portion of the spectrum by the object at that pixel location in the image, the value corresponding to that pixel in the resultant array 120 (shown in FIG. 12) would be set to a non-zero value. If the difference in the corresponding pixels of the red and blue arrays of FIG. 8 is less than 25, the corresponding pixel value in array 120 is set to zero.

In some cases, it may be advantageous to transform the image data from the RGB regime to a more intuitive color regime, such as HSI (hue, saturation, intensity) prior to performing the color extraction processing of the image (at 118). Use of any one (or more) of a variety of color regimes to perform the color analysis is, thus, dependent upon the particular sorting application.

As shown in FIG. 12, a value is set to one for each position in the array corresponding to pixels which satisfy the threshold criteria and which are located in cell 1, 1 of the imaginary matrix. Similarly, for each such pixel in cell 1, 2 of the matrix, the corresponding value is set to 2. Upon completion of this stage of analysis, the system thereby creates an array 120 of values which indicate those pixels in each cell of the imaginary matrix of the viewing area for which the pixel at that location satisfies the preselected criteria. It will be appreciated that, while one embodiment of the present invention generates different non-zero values for each of the pixels in different cells of the resultant matrix 120 in order to allow for quick association of the non-zero pixels with a particular cell, a simple binary scheme may also be employed (e.g., zero for all pixels not satisfying the color criteria and one for all pixels satisfying the color criteria) without departing from the spirit of the invention.

Once this initial determination is made, the array 120 may then be further processed to determine a one bit discriminator value for each cell in the imaginary matrix. For example, for brass, copper/zinc separation in one embodiment, the number of pixels in cell 1,1 which satisfy the established criteria (i.e., are non-zero) are counted. If more than 50% of the pixels in that cell satisfy the criteria, a bit corresponding to cell 1,1 is set to one. This process is repeated for each of the cells in the array to yield an array 122 (shown in FIG. 13) of values (0 or 1), one for each of the cells in the imaginary matrix, indicating which of the cells in that image has been selected (i.e., which of the cells contains colors corresponding to brass or copper particles).

It will be appreciated that a variety of separation criteria can be established for determining whether a particular cell has been selected. Thus, while the above-described embodiment simply counts the non-zero pixels in any particular cell and sets the discriminator signal to one when that count exceeds the threshold portion of the total pixels in the cell, the distribution of the non-zero pixels in a particular cell could also be analyzed. Additionally, the frequency and/or distribution of non-zero pixels in neighboring cells might be considered. However, it will be appreciated that the relatively simple criteria utilized in the above-described embodiment is preferable wherever it can effectively discriminate between particles, since minimal processing time is employed for each image.

Similarly, the analysis utilized to create array 120 may vary, and may employ any combination of the red, green and blue data of arrays 112, 114, and/or 116, respectively, depending on the color discrimination being attempted. Again, in the application of separating copper or brass from zinc, both copper and brass can be easily distinguished from zinc based upon the relatively greater reflectance by copper and brass of the red portion of the spectrum from that of the zinc particles.

Thus, for example, a different, perhaps more complex, criteria may be utilized to separate copper particles from brass particles. In any event, the criteria should be selected so as to effectively separate the particles as desired, while minimizing the processing time associated with making the pixel-by-pixel, then cell-by-cell discrimination.

SEPARATOR CONTROL LOGIC

Figure 13:
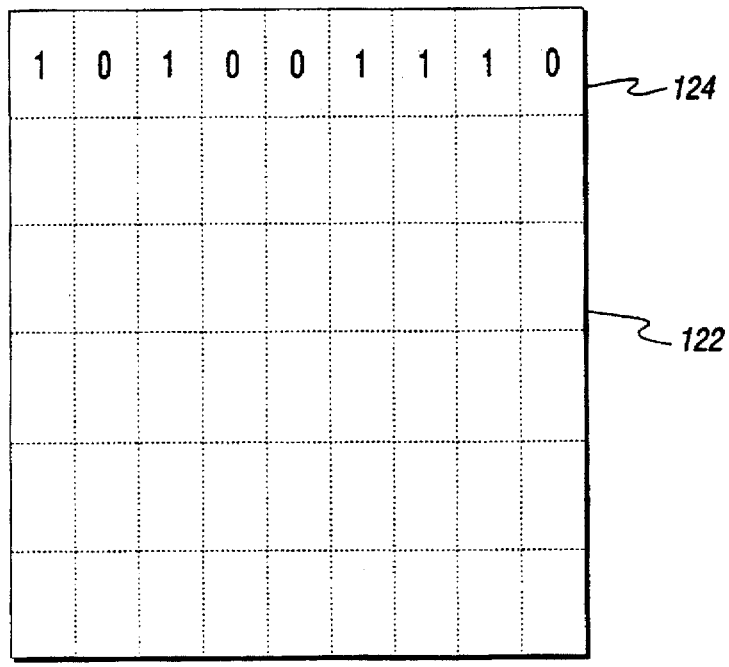
FIG. 13 is a diagram illustrating the discriminator signal values for each cell in the viewing area for a particular image.

Referring to FIG. 13, when each of the cells in a particular image have been analyzed, the discriminator signal values for that image may be transmitted to the separator control 36 portion of the PLC. The discriminator signal values for an image will typically be a data block of m×n bits for an m×n matrix of cells. This data block is then written into a memory queue in the PLC. The logic in the separator control then transmits the discriminator signals from the queue on a row-by-row basis. As previously described, the PLC determines, on the basis of information received from the position sensor 30, when the portion of the belt corresponding to a particular row of imaginary matrix cells has reached the discharge end of the conveyor. At a suitable time, the PLC transmits the signals necessary to activate those air blast valves positioned across the width of the conveyor at locations corresponding to cells in the non-zero cells in the current row, thereby causing an ejecting force of air at each selected cell location for the current row. The PLC repeatedly processes the discriminator signals received from the image processor on a row-by-row basis, in this timed fashion, to effectively provide any ejecting force for each selected cell for each row in each of the endless series of images of the traveling conveyor belt.

It will be appreciated that while the image data is acquired and analyzed in m×n cell matrices, preferably corresponding to images of the full 36 inch by 27 inch viewing area 24, subsequent transmission of those signals by the separator controller logic in the PLC is accomplished in 1×n arrays representing a single row of cells extending across the 27 inch width of the conveyor belt.

Figure 14:
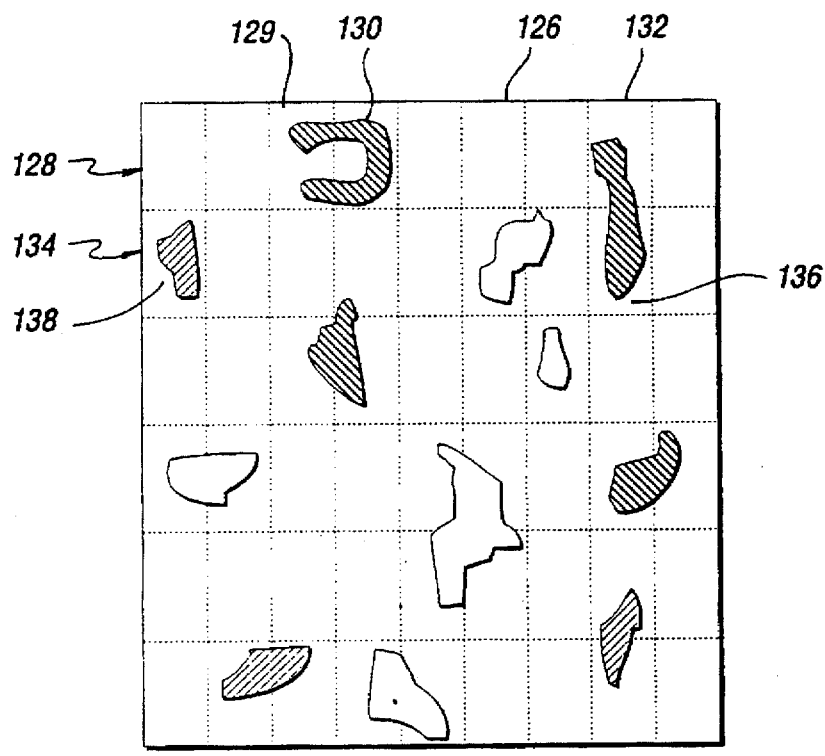
FIG. 14 is a diagram illustrating an image of the viewing area including scrap particles with a matrix superimposed thereon.

It will be appreciated that the system of the present invention provides several advantages over prior image processing sorting systems which allow for use of image processing in sorting scrap material. In particular, as illustrated in FIG. 14, for any set of scrap particles contained in an image 126 of the viewing area, the system of the present invention analyzes the color information on a cell-by-cell basis, rather than particle-by-particle. Thus, the processing time associated with identifying particles (whether by shape, color or otherwise) is eliminated. Processing speed is, therefore, not affected by the irregular shapes and sizes of the particles. Instead, the air nozzles of the separator are selectively activated on the basis of color discrimination for each cell in each row of the imaginary matrix of the viewing area to provide an ejecting force when the particles located on the conveyor belt in the positions corresponding to a particular row of cells in the imaginary matrix reaches the discharge end of the belt. Thus, when, for example, the portion of the belt depicted in imaginary row of cells 128 reaches the discharge end of the conveyor, the discriminator signals transmitted to the PLC will result in activation of the air nozzles at cell locations 129, 130 and 132. In the next period of time during which the portion of the belt depicted in the following row 134 is at the discharge end of the conveyor, the PLC will activate the air nozzle(s) in the area of cells 136 and 138.

While the specific embodiments disclosed herein contemplate implementation of the image processing, image detector, and separator control functions on separate hardware platforms, these functions could be integrated around a single multi-tasking computer capable of interrupt driven operation without departing from the spirit of the invention.

While the best mode for carrying out the present invention has been described in detail, those familiar with the art to which this invention relates will recognize various alternative designs and embodiments for practicing the invention as disclosed by the following claims.

What is claimed is:

1. A method for sorting scrap particles based upon color including the steps of:

conveying the scrap particles on an opaque belt conveyor having a surface providing a uniformly contrasting background for the particles;

determining the position of the conveyor;

providing constant, controlled illumination of different preselected wavelengths at a pre-defined viewing area along which the particles are conveyed by the conveyor;

acquiring data corresponding to a color image of the viewing area at timed intervals based upon the location of the conveyor;

employing an image processor computer to divide the viewing area into an imaginary matrix of cells and analyze the data corresponding to the image of the viewing area, independently of the presence or absence of particles in the viewing area, to determine for each cell in the matrix whether the color of the image in that cell satisfies a predetermined color criteria, and generate a discriminator signal for each cell of the matrix as a function of the comparison of each cell of the matrix with the predetermined color criteria; and sending a control signal to activate a separator located downstream from the image detector as a function of the discriminator signal to selectively actuate the separator to separate desired from undesired particles.

2. The method of claim 1 including the step of wetting the surface of the conveyor, thereby creating a more uniform background for the image of the particles supported and conveyed thereon.

3. The method of claim 1 wherein the conveyor comprises a plurality of endless belt conveyor sections and including the step of increasing the separation of the objects in the direction of conveyance by moving each subsequent conveyor section at a relatively faster speed than the immediately preceding conveyor section.

4. The method of claim 1 including the step of removing heat, dust and debris from the viewing area.

5. The method of claim 1 wherein each cell in the matrix includes a plurality of pixels, each pixel having a digital value corresponding to the image acquired by the image detector, and wherein the image processor computer further performs the steps of:

providing a resultant array of memory locations corresponding to the total number of pixels in the image;

providing a discriminator signal array of memory locations corresponding to the array of cells in the matrix;

determining for each pixel whether the value of that pixel satisfies a predetermined color criteria and setting a value in the location in the resultant array corresponding to that pixel as a function of the color criteria determination; and determining for each cell whether the values in the resultant array corresponding to pixels in that cell satisfies a predetermined separation criteria and setting a value in the location in the discriminator signal array corresponding to the cell as a function of the separator criteria determination.

6. The method of claim 5 wherein the separation step includes determining whether the color criteria is satisfied by a preselected minimum number of pixels in the cell.

7. The method of claim 5 wherein the separation step includes determining whether those pixels in the cell satisfying the color criteria satisfy a preselected distribution criteria.

8. The method of claim 5 further including the step of setting the value in the resultant array to non-zero for each pixel satisfying the color criteria and to zero for each pixel not satisfying the color criteria.

9. The method of claim 8 further including the step of associating a unique value with each of the cells, and where each of the non-zero values in the resultant array are set to the unique value of the cell in which the associated pixel is located.

10. A computer-implemented method for sorting randomly-shaped scrap particles as they are conveyed in random locations on a moving conveyor through a pre-defined viewing area, including the steps of:

acquiring data corresponding to an image of the viewing area;

dividing the viewing area into a matrix of cells, each cell including a plurality of pixels, defining a resultant array of memory locations corresponding to the total number of pixels in the image;

defining a discriminator signal array of memory locations corresponding to the total number of cells in the matrix;

determining for each pixel, independently of the presence or absence of particles in the viewing area, whether the data in that pixel satisfies a predetermined color criteria and setting a value in the location in the resultant array corresponding to that pixel as a function of the color criteria determination;

determining for each cell whether the values in the resultant array corresponding to pixels in that cell satisfies a predetermined separation criteria;

setting a value in the location in the discriminator signal array corresponding to the cell as a function of the separator criteria determination; and sending a control signal to activate a separator located downstream from the image detector as a function of the discriminator signal to selectively actuate the separator to separate desired from undesired particles.

11. The method of claim 10 wherein the separation criteria includes a determination of whether the color criteria is satisfied by a preselected minimum number of pixels in the cell.

12. The method of claim 10 wherein the separation criteria includes a determination of whether those pixels in the cell satisfying the color criteria satisfy a preselected distribution criteria.

13. The method of claim 10 further including setting the value in the resultant array to non-zero for each pixel satisfying the color criteria and to zero for each pixel not satisfying the color criteria.

14. The method of claim 10 further including associating a unique value with each of the cells, and where each of the non-zero values in the resultant array are set to the unique value of the cell in which the associated pixel is located.

15. A method for sorting scrap particles based upon color as the particles are conveyed on a moving conveyor; the method comprising:

determining the position of the conveyor;

periodically acquiring an image of a defined viewing area on the conveyor;

employing a computer image processor for receiving from the image detector the data corresponding to an image of the viewing area, dividing the viewing area into a matrix of cells, wherein each cell includes a plurality of pixels, determining for each cell in the viewing area, independently of the presence or absence of particles in the viewing area, whether the pixels in that cell satisfy a predetermined separation criteria, and transmitting a discriminator signal corresponding to each cell;

employing a first computer controller for receiving a signal from the position sensor, determining whether the conveyor has moved a distance equal to the length of the viewing area, and as a function of that determination, sending an activation signal to acquire an image; and employing a second controller for receiving a signal from the position sensor, determining whether the conveyor has moved a distance equal to the length of a cell, and sending a control signal to activate a separator located downstream from the image detector as a function of the discriminator signal received from the image processor to separate desired from undesired objects.

16. A method for sorting scrap particles based upon color including the steps of:

conveying the scrap particles on an opaque belt conveyor having a surface providing a uniformly contrasting background for the particles;

determining the position of the conveyor;

providing constant, controlled illumination of different preselected wavelengths at a pre-defined viewing area along which the particles are conveyed by the conveyor;

removing heat, dust and debris from the viewing area;

acquiring data corresponding to a color image of the viewing area at timed intervals based upon the location of the conveyor;

employing an image processor computer to divide the viewing area into an imaginary matrix of cells and analyze the data corresponding to the image of the viewing area, independently of the presence or absence of particles in the viewing area, to determine for each cell in the matrix whether the color of the image in that cell satisfies a predetermined color criteria, and generate a discriminator signal for each cell of the matrix as a function of the comparison of each cell of the matrix with the predetermined color criteria; and sending a control signal to activate a separator located downstream from the image detector as a function of the discriminator signal to selectively actuate the separator to separate desired from undesired particles.

* * * * *